Feb. 21, 1961 E. E. HOWE 2,972,186
MANDREL SWAGE
Filed Nov. 14, 1955
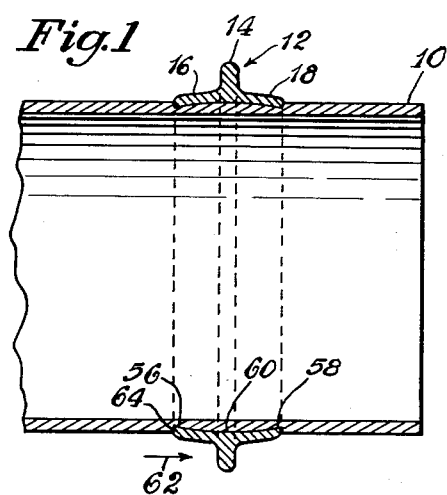
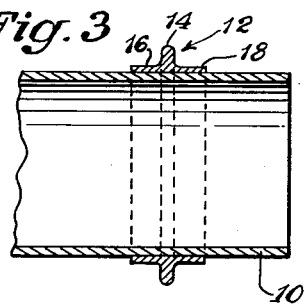
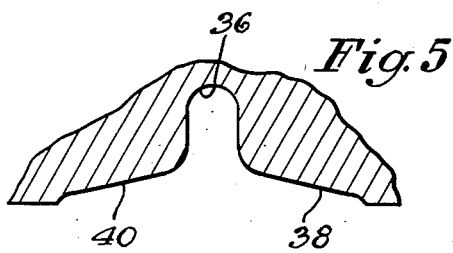
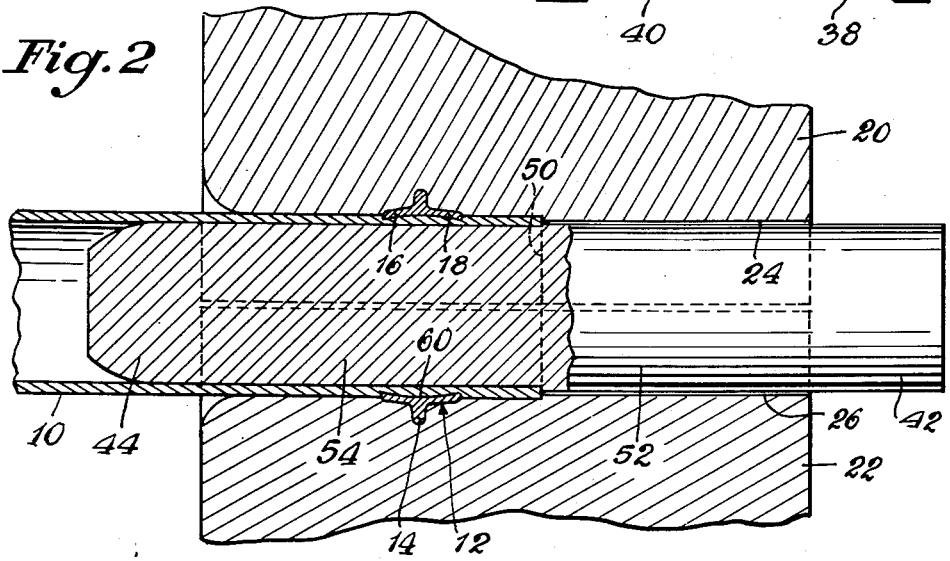
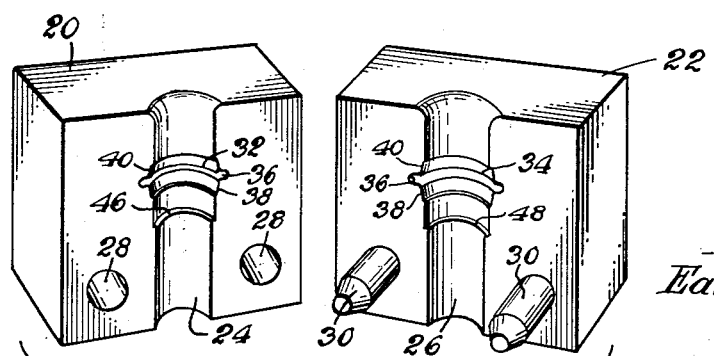
Inventor
Earl E. Howe
by Parker & Carter
Attorneys

United States Patent Office 2,972,186
Patented Feb. 21, 1961

2,972,186
MANDREL SWAGE

Earl E. Howe, Chicago, Ill., assignor to Chicago Forging and Manufacturing Company, Chicago, Ill., a corporation of Delaware Filed Nov. 14, 1955, Ser. No. 546,328

1 Claim. (Cl. 29—516)

This invention resides in the field of flexible couplings or fittings, commonly called tube fittings, and is an improved fitting or joint and a method of forming it whereby a connection may be effected between a relatively thin wall tube and a coupling for connection to a casting or the like.

A primary object of my invention is a method and apparatus for forming a connection with a tube so that the connection will withstand longitudinal forces.

Another object of my invention is a new and improved method and apparatus for effecting a relatively permanent connection with a relatively thin wall tube without indenting or marring the inner surface of the tube but at the same time, shearing into the body of the tube.

Another object of my invention is a new and improved apparatus for permanently securing a ferrule or rib on a thin wall tube to effect a connection that has increased longitudinal strength.

Another object of my invention is a connection of the above type constructed so that wires having approximately the same diameter as the tube, for example, bodenwire, can be passed into the tube without any interference by the connection.

Another object of my invention is a method of swaging a ferrule into the surface of a thin wall tube in direct shear.

Other objects will appear from time to time in the ensuing specification and drawings in which:

Figure 1 is a section through the end of a tube, on an enlarged scale, showing a ferrule swaged in position;

Figure 2 is a section, similar to Figure 1 but on a reduced scale, showing the swaging operation;

Figure 3 is a view partly in section of the end of a tube with a ferrule in position before swaging;

Figure 4 is a perspective of the swaging dies, and

Figure 5 is an enlarged section of one of the dies.

This invention is in the field of tube fittings, for example, as shown in my prior U.S. Patent No. 2,301,280 in which a ferrule is first secured around the end of a relatively thin wall tube. An elastic grommet or rubber annulus is placed around the ferrule and subjected to compression by a pair of interfitting members which define a compression chamber around the sealing unit. In my prior U.S. Patent No. 2,381,747 I disclose a tool for securing the ferrule on the tube by subjecting it to compression.

The rib has been formed as an integral part of the tube by rolling or compressing the end of the tube outwardly into a continuous bead, an example of this being my prior U.S. Patent No. 2,431,120. In this construction the integral bead forms a joint with adequate longitudinal strength and allows the inner surface of the tube to stay approximately at a constant diameter.

It is an object of this invention to provide a fitting or connection which has the longitudinal strength of an integral bead or rib but is not as expensive or difficult to make.

In Figure 3, I have shown a tube 10 of any conventional thin wall type, and although I have stated that this is a thin wall tube, nevertheless many aspects of the invention are not necessarily restricted to thin wall tubes. A ferrule indicated generally at 12, preferably continuous, is composed of an annulus having an upstanding rib 14, and side flanges 16 and 18 of approximately the same dimensions. The ferrule in the normal manner is slipped over the end of the tube as its inside diameter is approximately the same but slightly greater than the outside diameter of the tube and it is positioned near the tube end.

A pair of dies, such as shown at 20 and 22, are then positioned around the end of the tube. The dies have generally aligned or opposed grooves or slots 24 and 26 to accept the end of the tube. One die has suitable openings 28 aligned with corresponding positioning pins 30 on the other which guide the dies properly. Each die has an indentation or working station 32 and 34 which conform generally to the contour of the ferrule and are adapted to work it into the surface of the tube. In Figure 2 I have shown the dies in position around the end of the tube and ferrule after pressure has been applied by the dies in a suitable vise or other pressure applying mechanism. Each die includes a deep semicircular groove 36 which conforms closely to the rib 14 on the ferrule and is dimensioned so that pressure is not applied radially inwardly on the rib. The die surfaces on each side of the groove as at 38 and 40 slope inwardly toward the surface of the channel so that pressure will be applied from the outer edge of each of the flanges inwardly in a progressive manner toward the rib.

To prevent the inner surface from being distorted, a suitable mandrel or inner support 42 is positioned in the end of the tube and the diameter of the mandrel should be approximately the same as the inside diameter of the tube. The mandrel should protrude slightly on the other side of the dies, as at 44, so that the tube will be supported throughout its length under the dies. Any suitable connecting means can be used for the insertion and removal of the mandrel and this could take the form of an automatic mechanism of any suitable type with the leading edge or end of the mandrel being tapered for easy insertion, if desired. Each of the dies has a shoulder, at 46 and 48, which should abut the end of the tube as a stop. The mandrel may also have a shoulder 50 to engage the end of the tube to fix the distance it is inserted and the mandrel has a large diameter section 52 and a smaller diameter section 54. Section 54 has approximately the same diameter as the I.D. of the tube for a sliding fit. The tube I.D. is at least greater than the O.D. of the shoulder in the dies, and the section 52 of the mandrel has a diameter less than the I.D. of the shoulder in the dies.

It is important that the pressure from the dies be substantially continuous around the tube and directed inwardly on the flanges of the ferrule in a radial direction, and at the same time the inner surfaces of the tube should be rigidly supported by a mandrel or otherwise to prevent the tube from collapsing or buckling. In effect, the pressure is applied in two annular bands, rings or zones on the flanges 16 and 18 with no pressure on the rib so that the bands or zones of pressure are spaced from each other. Each annular pressure band is initially applied against the outer edge of the flange and progresses inwardly due to the sloping contour of the die surfaces 32 and 40 toward the rib a predetermined distance until it terminates adjacent the rib.

In Figure 1 a finished connection is shown and the edges or flanges of the ferrule have been sheared at 56 and 58 a substantial distance into the surface of the tube while the inner surface remains unmarred and of the same diameter. It is significant that the side edges or outer edges of the ferrule flanges have bitten deeply into the tube and bluntly abut the annular walls or opposed shoulders created by shear in the tube. At the same time the wall thickness directly under the rib at 60 is approximately the same as the original wall thickness of the tube, and the tube metal formed inwardly away from the shear zones will force the rib outwardly a small amount.

It can therefore be seen that a fitting of this nature produced by this method will have the strength of an integral rib, but the inner surface of the tube is not marred, and a connection formed in this manner, will have substantial longitudinal strength. An annular force on the ferrule, indicated by the arrow 62, will be taken by the blunt abutting surfaces at 58, and the flange of the ferrule will not ride up and out of its indented bead in the tube. At the same time the tube will accept and pass wires or cables which have approximately the same diameter as the inside of the tube. The surface of the tube remains smooth and such a fitting does not cause a bottleneck or restriction.

While I have shown and described the preferred form of my invention, it should be understood that numerous modifications, substitutions, changes, and alterations can be made without departing from the invention's fundamental theme. I therefore wish that the invention be unrestricted except as by the appended claim.

I claim:

A method of swaging a continuous annular ferrule onto a thin, smooth walled tube, the ferrule having a central outstanding rib with flanges on each side of the rib, including the steps of positioning the ferrule around the tube, applying continuous annular pressure only initially at the outer edge of the flanges, progressively increasing the areas of applied pressure uniformly inwardly toward the rib to shear the flanges into the tube, supporting the inner surface of the tube at all times during pressure application, whereby the original inner diameter of said tube is maintained and discontinuing the applied pressure when the pressure zones are still spaced from the rib.

References Cited in the file of this patent

UNITED STATES PATENTS

| | | |
|---|---|---|
| 407,038 | Robertson | July 16, 1889 |
| 489,439 | Vollner et al. | Jan. 3, 1893 |
| 930,863 | Kearney | Aug. 10, 1909 |
| 2,225,345 | Lamoreaux | Dec. 17, 1940 |
| 2,230,116 | Kreidel | Jan. 28, 1941 |
| 2,256,740 | Gup | Sept. 23, 1941 |
| 2,301,280 | Howe | Nov. 10, 1942 |
| 2,335,414 | Hinrichs | Nov. 30, 1943 |
| 2,382,359 | Weightman | Aug. 14, 1945 |
| 2,417,536 | Wurzburger | Mar. 18, 1947 |
| 2,455,667 | Franck | Dec. 7, 1948 |